Figure 1:
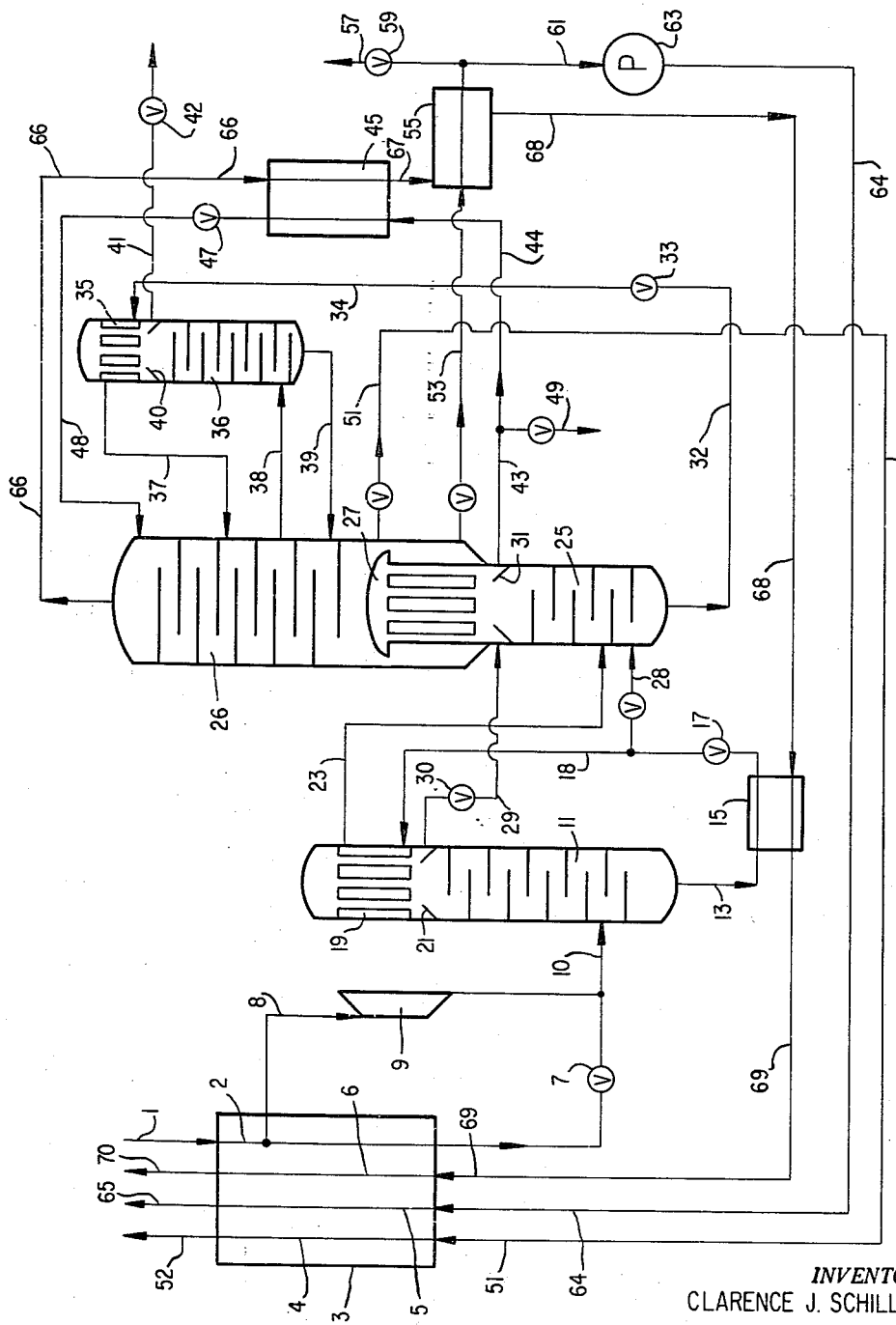

March 5, 1963  C. J. SCHILLING  3,079,759
SEPARATION OF GASEOUS MIXTURES
Filed March 22, 1961
2 Sheets-Sheet 2

INVENTOR.
CLARENCE J. SCHILLING
BY Shanley & O'Neil
ATTORNEYS

United States Patent Office 3,079,759
Patented Mar. 5, 1963

3,079,759
SEPARATION OF GASEOUS MIXTURES
Clarence J. Schilling, Allentown, Pa., assignor, by mesne assignments, to Air Products and Chemicals, Inc., Trexlertown, Pa., a corporation of Delaware
Filed Mar. 22, 1961, Ser. No. 97,568
15 Claims. (Cl. 62—29)

The present invention relates to the separation of gaseous mixtures, more particularly to low temperature separation of gaseous mixtures in a multi-stage fractionating operation.

It is well known that the purity of product components of gaseous mixtures separated in fractionation operations depends in large part on the reflux ratios prevailing in the regions in which the components are produced. In a conventional Linde double column the crude oxygen is withdrawn from the base of the relatively high pressure stage and introduced as feed into the relatively low pressure stage, while gaseous nitrogen overhead in the high pressure stage is condensed and a portion used as reflux in the high pressure stage and the remainder used as reflux in the low pressure stage. Considering the proportions of nitrogen and oxygen in air, it is obvious that even if the separation in the high pressure stage were perfect and all of the condensed nitrogen overhead were fed to the low pressure stage as reflux, the low pressure reflux would not be more than about 80% of the total air. In reality, however, the separation in the high pressure stage is far from perfect; and in addition, it is necessary to use a portion of the condensed nitrogen overhead as reflux in the high pressure stage to achieve even that imperfect separation. Therefore, the liquid nitrogen produced in the high pressure stage and available as reflux for the low pressure stage is very substantially less than 80% of the total air. In the low pressure stage, however, the separation between oxygen and nitrogen is virtually complete, the oxygen which is produced in liquid phase at the bottom of the low pressure stage being about 20% of the total air and the nitrogen leaving the top of the low pressure stage in gaseous phase being about 80% of the total air.

At the top of the low pressure stage, where the separation is primarily between nitrogen and oxygen, it is desirable to contact the rising gases with as much reflux liquid as possible in order to obtain a gaseous nitrogen product containing as little oxygen as possible. Therefore, the higher the reflux ratio the better. At the bottom of the low pressure stage, adjacent the point of liquid oxygen withdrawal, liquid oxygen is descending and is being stripped of lower boiling components by rising vapors. The separation at this point is primarily between argon and oxygen, and it is desirable to contact the falling liquid with as much rising vapor as possible. As the falling liquid is equal to the sum of the rising vapor and the liquid which is withdrawn as product liquid oxygen, it is obvious that the falling liquid will always be greater in amount than the rising vapor, that is the reflux ratio will always be greater than 1.00 so long as there is product withdrawal. With no product withdrawal, the rising vapor would be equal to the falling liquid and the reflux ratio would be at its theoretical minimum, namely, 1.00. Hence, the less in excess of 1.00 the reflux ratio is at the bottom of the low pressure stage, the better. In other words, the lower the reflux ratio at the bottom of the low pressure stage, the better.

To illustrate the difficulties of the prior art in achieving desirable reflux ratios, let it be assumed that 100 parts of cooled, cleaned and dried air is introduced into the high pressure stage of a double column, 25 parts in liquid phase and 75 parts in vapor phase, and that a reflux ratio of, say, 0.55 is maintained in the high pressure stage and that a product equal to 20% of the feed is withdrawn in liquid phase from the base of the low pressure stage. Thus, the quantity of reflux used in the high pressure stage will be 75×0.55=41.25 parts, which leaves 75−41.25, or 33.75 parts available as reflux to be withdrawn from the high pressure stage in liquid phase, reduced in pressure and introduced into the low pressure stage at the top thereof as reflux. Since 20 parts of oxygen are removed in liquid phase at the bottom of the low pressure column, it follows that 100−20, or 80 parts will leave as overhead nitrogen in vapor phase. Hence, the reflux ratio at the top of the low pressure column will be 33.75/80 or 0.423, which is quite inadequate to give good nitrogen purity. At such a low reflux ratio, argon and oxygen will be present in the effluent nitrogen; and by increasing the quantity of effluent vapor, the argon and oxygen will reduce the reflux ratio even below the calculated ratio.

One factor limiting the amount of reflux available for the top of the low pressure column is the amount of vapor rising in the high pressure column above the feed level. This vapor can be increased to a maximum by introducing the feed into the high pressure column totally in vapor phase. In that case, with the same reflux ratio of 0.55 for the high pressure column, the liquid available as reflux for the top of the low pressure column is 100−(100×0.55), or 45 parts, and the reflux ratio at the top of the low pressure column then becomes 45/80 or 0.5625. However, with the feed all in vapor phase, there is insufficient refrigeration in the system to permit withdrawal of a liquid product.

Accordingly, it is an object of the present invention to provide methods and apparatus for the separation of gaseous mixtures by low temperature liquefaction and fractionation in a multi-stage fractionating operation, characterized in that the reflux ratios for product separation are brought closer to the theoretical ideal of unity.

Another object of the present invention is the provision of such methods and apparatus in which improved reflux ratios may be obtained and employed in a wide variety of ways, for example, to improve the purity of any or all of the products; to sharpen the separation of any component of intermediate boiling point; to conserve refrigeration so as to require less refrigeration of the feed or less compression of the feed, or to make possible the simultaneous production of a plurality of liquid products; and to enable reduction in the number of trays in the fractionating columns.

The invention also contemplates the provision of such methods and apparatus useful in improving product purity without decreasing product quantity.

Still another object of the present invention is the provision of such methods and apparatus useful in connection with air separation cycles to produce high purity nitrogen or high purity oxygen in either liquid or vapor phase, or to effect good separation between oxygen and argon when an argon column is used and to achieve relatively high argon concentrations at the level of maximum argon concentration.

Other objects and advantages of the present invention will become apparent from a consideration of the following description, taken in connection with the accompanying drawings.

Figure 2:
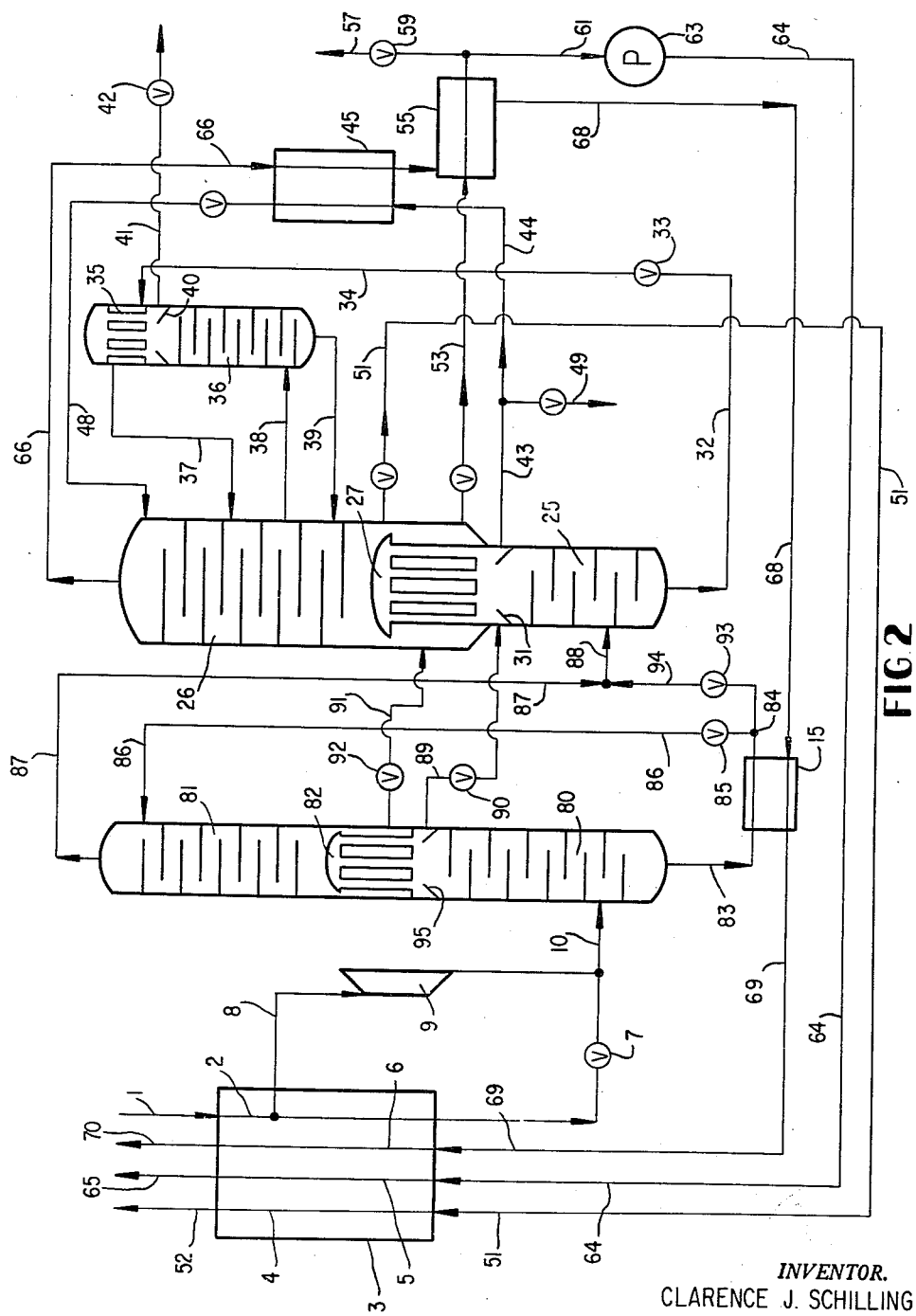

In the drawings, in which similar reference characters denote similar elements throughout the several views:

FIGURE 1 is a schematic diagram of a separation cycle illustrating one embodiment of the invention, and FIGURE 2 is a diagrammatic showing of another embodiment of the present invention.

With reference to FIGURE 1 of the drawings, there is shown therein a cycle for the separation of gaseous mixtures which will be described, solely by way of example, in connection with air. It is to be understood, however, that other gaseous mixtures are comprehended by the present invention and are considered to be within the scope of the appended claims.

In FIGURE 1, compressed air dried and freed of carbon dioxide enters the system through conduit 1, by which it passes through a passageway 2 of a heat exchanger 3 wherein it is cooled against the products of separation flowing through passageway 4, 5 and 6 as described below. Most of the air leaves the cold end of exchanger 3 and is expanded in an expansion valve 7. In order to provide refrigeration for the system a side stream is withdrawn from a medial part of the passageway 2 through conduit 8, and is expanded with the production of external work in an expansion turbine 9 after which it rejoins the main air stream flowing through valve 7 and the combined streams are fed by conduit 10 to a preliminary separating column 11.

A preliminary separation of the air feed is effected in the column 11 providing an oxygen-rich liquid higher boiling component and a gaseous nitrogen lower boiling component. The oxygen rich liquid is withdrawn from the bottom of column 11 through a conduit 13 and subcooled upon heat interchange with nitrogen product of the separation in exchanger 15 as described below. The subcooled liquid is expanded through an expansion valve 17, so that its temperature is substantially lowered relative to the material remaining in column 11. The expanded material is introduced through conduit 18 into a condenser 19 at the top of column 11, where it brings down a condensate from the vapor phase overhead in column 11, essentially nitrogen. This liquid nitrogen collects in part on a shelf 21 immediately under condenser 19, while the remainder provides reflux for the column 11. The condensation of liquid nitrogen results in the evaporation of liquid material supplied to the condenser 19 through conduit 18, and such material leaves condenser 19 at least partly in vapor phase and is passed through conduit 23 and introduced as feed at an appropriate level in high pressure fractionating stage 25 of a two stage fractionating column including a low pressure stage 26 and a refluxing condenser 27. If desired, a portion of the liquid withdrawn from the column 11 may be passed through valved conduit 28 and introduced directly into the high pressure stage. The material collecting on shelf 21 is withdrawn through conduit 29 and expanded in valve 30 to about the pressure of stage 25 and introduced into the high pressure stage 25 above the shelf 31 located below the refluxing condenser 27.

In the high pressure stage 25 the feed mixture is separated into a liquid high boiling point fraction, i.e., crude liquid oxygen, and gaseous low boiling point fraction, essentially nitrogen, which is condensed in the refluxing condenser 27. A portion of the condensed nitrogen collects on the shelf 31 and the remainder provides reflux in the high pressure stage. A stream of crude oxygen is withdrawn from the high pressure stage through conduit 32 and expanded in valve 33 to a lower pressure and cooled accordingly. The expanded crude oxygen is fed to the low pressure stage 26 at an appropriate level wherein the separation is completed producing gaseous nitrogen overhead product and liquid oxygen product collecting about the refluxing condenser.

If desired the crude oxygen feed to the low pressure stage may be passed by conduit 34 to a condenser 35 of an argon side column 36 and then conducted by conduit 37 to the low pressure stage. The argon side column 36 may be fed from the low pressure stage through conduit 38 and liquid bottoms returned to the low pressure stage by conduit 39. Argon product collects on a shelf 40 located below the condenser 35 and is withdrawn from the column through conduit 41 having a control valve 42. It is to be expressly understood that the expanded crude oxygen may be introduced directly into the low pressure stage should the argon side column illustrated not be desired.

Liquid oxygen product collecting about the condenser 27 results in condensation of gaseous low boiling point fraction of the high pressure stage as described above and a portion of the condensed nitrogen collects on the shelf 31 together with liquid nitrogen supplied through conduit 29. Liquid nitrogen is withdrawn from above the shelf 31 through conduit 43 with at least a portion being passed through conduit 44, subcooled in heat exchange device 45, expanded in valve 47 to the pressure of the low pressure stage and introduced as reflux liquid into the top of low pressure stage through conduit 48. If desired, a portion of liquid nitrogen withdrawn from above the shelf 31 may comprise liquid nitrogen product removed from the system through a valve-controlled branch conduit 49. It is to be expressly understood that it is not essential that the liquid nitrogen in conduit 29 be introduced into the top of the high pressure stage 25 above the shelf 31. Instead, it could be introduced, following expansion to a lower pressure, into conduits 43 or 44 or directly into the top of the low pressure stage 26.

Product oxygen may be withdrawn from the low pressure stage 26 in either vapor phase or liquid phase. Oxygen product in vapor phase may be withdrawn through a valve-controlled conduit 51 communicating with the low pressure stage above the pool of liquid oxygen surrounding the refluxing condenser. The conduit 51 conducts the gaseous oxygen to passageway 4 for countercurrent heat interchange with the incoming feed mixture; the gaseous oxygen leaving the system through conduit 52 at substantially ambient temperature. Oxygen product in liquid phase may be withdrawn through a valve-controlled conduit 53 and subcooled in heat exchanger 55. Subcooled liquid oxygen may be delivered from the system as product through conduit 57 provided with a control valve 59, or may be passed through conduit 61 to a liquid oxygen pump 63. High pressure liquid oxygen from the pump 63 is conducted by conduit 64 to passageway 5 of the heat exchange device 3 wherein the liquid oxygen is evaporated upon countercurrent heat interchange with the feed mixture and leaves the system through conduit 65 at substantially ambient temperatures and under a pressure determined by the pump 63. It will of course be understood that whether the product oxygen is withdrawn from the low pressure stage in liquid or vapor phase does not affect the reflux ratio at the bottom of the low pressure stage since the quantity of rising vapor and falling liquid is the same providing the same quantity of oxygen product is withdrawn. Of course, if oxygen product is withdrawn from the system in liquid phase additional refrigeration is required. The refrigeration requirement is also present when nitrogen product is withdrawn in liquid phase.

The nitrogen overhead product from low pressure stage 26 is withdrawn through conduit 66, passed to heat exchange device 45 to subcool the liquid nitrogen, passed by conduit 67 to heat exchange device 55 to subcool the oxygen product, and then conducted by conduit 68 to the heat exchanger 15. The warmed nitrogen from the latter heat exchanger is passed by conduit 69 for flow through passageway 6 of the heat exchange device 3 in countercurrent heat interchange with the feed mixture; the nitrogen product being withdrawn from the system through conduit 70 at substantially ambient temperature.

In one mode of operation of the embodiment of FIGURE 1, cool, dry, carbon dioxide-free air is introduced into column 11 at 150 p.s.i.a. and 20 parts of oxygen product in liquid phase is withdrawn from the system through conduit 57. Of 100 parts entering column 11, 80 parts of higher boiling component are withdrawn in liquid phase through conduit 13, expanded through valve 17 to about 100 p.s.i.a. and then vaporized in condenser 19 to 75 parts vapor and 5 parts of liquid. If desired, 5 parts of the expanded liquid may be fed through conduit 28 directly to the high pressure stage 25 and the remaining 75 parts completely vaporized in the condenser 19. Of the nitrogen liquefied in the condenser 19, 20 parts is removed through conduit 29 in liquid phase, expanded in expansion valve 30 to about 100 p.s.i.a. and introduced into the top of high pressure stage 25 above the shelf 31. A reflux ratio of 0.55 is maintained in high pressure stage 25; and the liquid nitrogen from condenser 27 available for reflux in the low pressure stage 26 is 75—(75×0.55), or 33.75 parts. However, the 20 parts of liquid nitrogen from column 11 is available as reflux for the low pressure stage so that a total of 53.75 parts of liquid nitrogen passes through conduits 43, 44 and 48 to the top of the low pressure stage. Thus the reflux ratio in low pressure stage 26 becomes 53.75/80, or 0.672, which is an excellent reflux ratio allowing high recovery of all components and high purity of the effluent nitrogen leaving the column through conduit 66, as would be particularly desirable, for example, in a plant producing nitrogen for ammonia synthesis. The low pressure stage operates under a pressure of about 20 p.s.i.a.

According to another mode of operation of the embodiment of FIGURE 1, instead of passing all of the liquid nitrogen withdrawn from shelf 31 through conduit 44, 8 parts are withdrawn in liquid phase through valved conduit 49 as a liquid nitrogen product, the remaining 45.75 parts passing in liquid phase as before to the top of the low pressure stage 26. This withdrawal of nitrogen product prior to the low pressure separation is reflected in a corresponding reduction in the quantity of gaseous overhead leaving through conduit 66. Hence, the vapor at the top of the low pressure stage 26 is 80—8, or 72, and the new reflux ratio is 45.75/72, or 0.635, which is adequate for suitable separation.

It will of course be understood that the liquid product withdrawn from the system may comprise oxygen and nitrogen or oxygen alone or nitrogen alone. In any event the total liquid product that may be withdrawn from the system will depend upon the available refrigeration.

As an example of gas plant operation benefited by the present invention, the column 11, which is considered as operating at constant enthalpy, produces 7 parts of liquid nitrogen withdrawn through conduit 29 and 93 parts of saturated vapor introduced into the high pressure stage 25 through conduit 23. With a reflux ratio of 0.55 for the high pressure stage 25, 93—(93×0.55), or 41.8 parts of liquid nitrogen is available from the high pressure stage as reflux for the low pressure stage. However, the 7 parts of liquid nitrogen withdrawn from column 11 is available also as reflux for the low pressure stage and the reflux ratio for the low pressure stage becomes 48.8/80, or 0.610. In a system employing conventional two stage fractionating columns with 100 parts of feed entering the high pressure stage as a saturated vapor and with a reflux rate of .55 maintained in the high pressure stage, about 45 parts of liquid nitrogen is available as reflux for the low pressure stage and the obtainable reflux for the latter stage is about .56. The improved reflux ratio of .61 obtained by practicing the principles of the present invention results in an increase in purity of the gaseous nitrogen leaving the low pressure stage without sacrificing oxygen purity.

The improvement in reflux ratios obtained by practicing the principles of the invention makes it possible to improve the impurity of the products of the separation. For example, it is possible to provide an air separation system in which the total nitrogen component is obtainable in a higher degree of purity without decreasing the high purity of the oxygen component. Thus the present invention provides a system in which all components of the mixture undergoing separation are obtainable in a high degree of purity.

Another embodiment of the invention is shown in FIGURE 2. In this embodiment the air feed after expansion in valve 7 and engine 9 is introduced through conduit 10 into a high pressure stage 80 of a preliminary separator in the form of a double column including a low pressure stage 81 and a refluxing condenser 82. Liquid high boiling point fraction collecting in the bottom of the high pressure section 80 is withdrawn therefrom through conduit 83, subcooled in exchanger 15 against product nitrogen, and then divided at point 84 with one portion, which may comprise the major portion, being expanded in valve 85 and then introduced through conduit 86 into the low pressure stage 81 adjacent the top thereof. In the low pressure stage 81 the liquid introduced through conduit 86 is separated into pure liquid oxygen surrounding the condenser 82 and a low boiling point fraction removed from the top of the stage and introduced into the high pressure stage 25 through conduits 87 and 88. Gaseous low boiling point fraction, consisting of pure nitrogen, separated in the high pressure stage 80 is liquefied in the condenser 82 and a portion of such liquid nitrogen provides reflux for the latter stage while another portion collects on the shelf 95 located below the condenser 82. Liquid nitrogen is withdrawn from above the shelf 95 through conduit 89, having a control valve 90, and introduced into the high pressure stage 25 above the shelf 31. Liquid oxygen is withdrawn from low pressure stage 81 and introduced into the bottom of the low pressure stage 26 through conduit 91 provided with a control valve 92. The other portion of the liquid withdrawn from the high pressure stage 80 through conduit 83 is passed through expansion valve 93 and then conducted by conduit 94 for flow into the high pressure stage 25 through conduit 88. If desired the liquid in conduit 94 and the gaseous fraction in conduit 87 may be introduced into the high pressure stage 25 through separate conduits communicating with the stage at different levels.

It is to be expressly understood that the liquid oxygen withdrawn from the low pressure stage 81 need not be introduced into the low pressure stage 26 as illustrated and as described above but may be merged with the liquid oxygen in conduits 53, 57 or 61 or may be withdrawn from the system independently of other oxygen product either in liquid phase, or in a gaseous phase under a pressure as exists in the low pressure stage 81 or under relatively high pressure by pumping the liquid oxygen to such relatively high pressure and then vaporizing the pumped liquid oxygen in heat interchange with a relatively warm fluid such as the incoming feed mixture. Likewise, as in the embodiment shown in FIGURE 1, the liquid nitrogen withdrawn through conduit 89 may be merged with the liquid nitrogen in conduit 43, or in whole or in part fed directly to the low pressure stage 26 as reflux or withdrawn from the system through a separate conduit as nitrogen product.

In operation of the embodiment of the invention shown in FIGURE 2, the air feed is expanded in the valve 7 and the engine 9 to about 300 p.s.i.a. which is the operating pressure of the high pressure stage 80. The liquid withdrawn from the high pressure stage 80 through conduit 83 is expanded in valves 85 and 93 to about 100 p.s.i.a., the operating pressure of the low pressure stage 81 and the high pressure stage 25. The low pressure stage 26 operates at about 20 p.s.i.a. and fluid streams fed to the latter stage are expanded down to that pressure. On the basis of 100 parts of air feed entering the system, 92 parts of the high boiling point liquid fraction are withdrawn through conduit 83 and of such 92 parts, 82 parts flow through conduit 86 to the low presure stage 81 and 10 parts are introduced by conduit 94 into the high pressure stage 25. The vapor fed to the high pressure stage 25 through conduit 87 comprises 75 parts while 7 parts of liquid oxygen are withdrawn through conduit 91 and 8 parts of liquid nitrogen are withdrawn through conduit 89. The feed of the high pressure stage 25 is 75 parts vapor and 10 parts liquid and with a reflux of .55, 33.75 parts of liquid nitrogen are produced in the high pressure stage 25 for use as reflux for the low pressure stage 26. However, the 8 parts of liquid nitrogen withdrawn for the high pressure stage 80 are available as reflux and a total of 41.75 parts of liquid nitrogen enter the low pressure stage 26 through conduit 48 providing a reflux ratio for the latter stage, above the feed point, of 0.522. With respect to the reflux ratio of the low pressure stage 26 below the feed point, of the 20 parts of liquid oxygen withdrawn through conduit 53, 7 parts are supplied from the low pressure stage 81 through the conduit 91. Hence, only 93 parts of liquid flow downwardly into the bottom of the low pressure stage 26 and the reflux ratio is 93/90 or 1.1625 which is a substantial approach to the optimum reflux ratio of 1.00. According to the prior art, 100 parts of liquid would flow downwardly and the bottom of the low pressure stage and the reflux ratio would be 100/80, or 1.25.

The separation that takes place below the feed point in the low pressure stage 26 is primarily between oxygen and argon. Thus, the improved reflux ratio means that the oxygen product will be of higher purity and will carry off less argon, just as the nitrogen overhead carries off less argon. At the same time, the argon concentration at the point of maximum argon concentration below the feed point of the low pressure stage 26 will be substantially higher than was obtainable by the prior art and hence the separation in an argon side column will be greatly facilitated. Thus the argon-rich vapor stream removed from low pressure stage 26 through conduit 38 and introduced into argon side column 36 includes a greater quantity of the argon content of the feed mixture and higher argon recovery is obtained. With a system as shown in FIGURE 2 and operating according to the foregoing example, it is possible to recover 80% of the argon of the feed mixture, as compared to 60% argon recovery obtainable from a similar system not including the novel features provided by the present invention. In this sense, the present invention provides a method for separating ternary gaseous mixtures of relatively high, intermediate and low boiling components. When the gaseous mixture is air, it can be treated as a ternary mixture of nitrogen, oxygen and argon, despite the fact that it also contains small quantities of other components.

It is to be expressly understood that the embodiment of FIGURE 2, like the embodiment of FIGURE 1, may be operated to produce oxygen product totally in liquid phase or totally in gaseous phase with the gaseous oxygen being under low pressure or high pressure by use of the pump 63 or partly under high pressure and partly under low pressure, or partly in liquid phase and partly in gaseous phase, that the nitrogen product may be delivered in similar manners, and that various combinations of phase and pressure of oxygen and nitrogen products may be obtained.

It will now be evident from the above examples that the improvement in the reflux ratios brought about by the present invention may be usefully employed in gas separation plants to achieve a number of desirable results. As has been seen, these improved ratios can be used to improve the purity of either or both of the top and bottom products of the lowest pressure stage, and concomitantly to sharpen the separation of any component of intermediate boiling point. They can also be used to conserve refrigeration so as to require less refrigeration for the system, or to improve the recovery of liquid products, or to enable the simultaneous production of a plurality of liquid products. By the same token, these improved reflux ratios can be used to enable reduction of the number of trays in the low pressure stage.

It is to be understood that the appended claims are to be accorded a range of equivalents commensurate in scope with the advance made over the prior art.

What is claimed is:

1. In a method of separating gaseous mixtures by low temperature fractionation in which separation takes place in a high pressure fractionating zone to provide gaseous low boiling fraction and liquid high boiling fraction and in which liquid high boiling fraction is fed to a low pressure fractionating zone to provide gaseous low boiling component and liquid high boiling component, comprising the steps of subjecting gaseous mixture to be separated to preliminary separation to provide low boiling component of the gaseous mixture in vapor phase and a second fraction, introducing thus-separated second fraction into the high pressure fractionating zone, liquefying thus-separated low boiling component in vapor phase, and utilizing thus-liquefied low boiling component as reflux for the low pressure fractionating zone.

2. In apparatus for separating gaseous mixtures by low temperature fractionation in which gaseous mixture undergoes separation in a high pressure fractionating column to provide gaseous low boiling fraction and liquid high boiling fraction and in which liquid high boiling fraction is fed to a low pressure fractionating column to provide gaseous low boiling component and liquid high boiling component; the improvement comprising means for subjecting gaseous mixture to be separated to a preliminary separator to provide low boiling component of the gaseous mixture in vapor phase and a second fraction, means for introducing thus-separated second fraction into the high pressure fractionating column, means for liquefying thus-separated low boiling component in vapor phase, and means for utilizing thus-liquefied low boiling component as reflux for the low pressure fractionating column.

3. In a method of separating gaseous mixtures by low temperature fractionation in which separation takes place in a high pressure fractionating zone to provide gaseous low boiling fraction and liquid high boiling fraction and in which liquid high boiling fraction is fed to a low pressure fractionating zone to provide gaseous low boiling component and liquid high boiling component; the improvement comprising subjecting gaseous mixture to be separated to preliminary separation to provide low boiling component of the gaseous mixture in vapor phase and a second fraction, introducing thus-separated second fraction into the high pressure fractionating zone, liquefying thus-separated low boiling component in vapor phase by indirect heat exchange with at least a portion of said second fraction prior to introduction of said second fraction into the high pressure fractionating zone, and utilizing thus-liquefied low boiling component as reflux for the low pressure fractionating zone.

4. The method as defined in claim 3 in which the gaseous mixture is separated to provide low boiling component while under a pressure higher than the pressure of the high pressure fractionating zone.

5. In a method of separating gaseous mixtures by low temperature fractionation in which separation takes place in a high pressure fractionating zone to provide gaseous low boiling fraction and liquid high boiling fraction and in which liquid high boiling fraction is fed to a low pressure fractionating zone to provide gaseous low boiling component and liquid high boiling component; the improvement comprising subjecting gaseous mixture to be separated to preliminary separation to provide a first vapor and a first liquid, separating first liquid into a second vapor and a second liquid, introducing second vapor into the high pressure fractionating zone as feed, and withdrawing second liquid as product.

6. A method as claimed in claim 5, the withdrawn second liquid passing through the bottom of the low pressure fractionating zone.

7. A method as claimed in claim 5 and liquefying first vapor, and utilizing thus-liquefied first vapor as reflux for the low pressure fractionating zone.

8. In a method of separating ternary gaseous mixtures of high, intermediate and low boiling components by low temperature fractionation in which separation takes place in a high pressure fractionating zone to provide gaseous low boiling fraction and liquid high boiling fraction and in which liquid high boiling fraction is fed to a low pressure fractionating zone to provide gaseous low boiling component and liquid high boiling component and a fraction rich in intermediate boiling component; the improvement comprising subjecting gaseous mixture to be separated to preliminary separation to provide low boiling component of the gaseous mixture in vapor phase and a second fraction, introducing thus-separated second fraction into the high pressure fractionating zone, liquefying thus-separated low boiling component in vapor phase, utilizing thus-liquefied low boiling component as reflux for the low pressure fractionating zone, withdrawing a stream of material rich in intermediate boiling component from an intermediate portion of the low pressure fractionating zone, and separating from the withdrawn stream a fraction still richer in intermediate boiling component.

9. In a method of separating ternary gaseous mixtures of high, intermediate and low boiling components by low temperature fractionation in which separation takes place in a high pressure fractionating zone to provide gaseous low boiling fraction and liquid high boiling fraction and in which liquid high boiling fraction is fed to a low pressure fractionating zone to provide gaseous low boiling component and liquid high boiling component and a fraction rich in intermediate boiling component; the improvement comprising subjecting gaseous mixture to be separated to preliminary separation to provide a first vapor and a first liquid, separating first liquid into a second vapor and a second liquid, introducing second vapor into the high pressure fractionating zone as feed, withdrawing second liquid as product, withdrawing a stream of material rich in intermediate boiling component from an intermediate portion of the low pressure fractionating zone, and separating from the withdrawn stream a fraction still richer in intermediate boiling component.

10. A method as claimed in claim 9, and liquefying first vapor, and utilizing thus-liquefied first vapor as reflux for the low pressure fractionating zone.

11. In a method of separating components of air by low temperature fractionation in which separation takes place in a high pressure fractionating zone to provide a gaseous fraction rich in nitrogen and a liquid fraction rich in oxygen and argon and in which liquid fraction rich in oxygen and argon is fed to a low pressure fractionating zone to provide gaseous nitrogen and liquid oxygen and a fraction rich in argon; the improvement comprising subjecting air to be separated to preliminary separation to provide nitrogen in vapor phase and a second fraction, introducing thus-separated second fraction into the high pressure fractionating zone, liquefying thus-separated nitrogen in vapor phase, utilizing thus-liquefied nitrogen as reflux for the low pressure fractionating zone, withdrawing a stream of material rich in argon from an intermediate portion of the low pressure fractionating zone, and separating from the withdrawn stream a fraction still richer in argon.

12. In a method of separating components of air by low temperature fractionation in which separation takes place in a high pressure fractionating zone to provide a gaseous fraction rich in nitrogen and a liquid fraction rich in oxygen and argon and in which liquid fraction rich in oxygen and argon is fed to a low pressure fractionating zone to provide gaseous nitrogen and liquid oxygen and a fraction rich in argon; the improvement comprising subjecting air to be separated to preliminary separation to provide a first vapor which is essentially nitrogen and a first liquid rich in oxygen, separating first liquid into a second vapor and a second liquid which is essentially oxygen, introducing second vapor into the high pressure fractionating zone as feed, withdrawing second liquid as product, withdrawing a stream of material rich in argon from an intermediate portion of the low pressure fractionating zone, and separating from the withdrawn stream a fraction still richer in argon.

13. A method as claimed in claim 12, and liquefying first vapor, and utilizing thus-liquefied first vapor as reflux for the low pressure fractionating zone.

14. Method of separating gaseous mixtures in a low temperature operation which comprises: separating from the gaseous mixture a first portion of a low boiling point component of the gaseous mixture, separating from the remaining gaseous mixture second portion of the low boiling point component and a fraction rich in a higher boiling point component, separating the fraction in a fractionating zone to produce gaseous low boiling component and liquid high boiling point component, liquefying the first and second portions of low boiling point component to provide liquid low boiling point component, and utilizing at least a part of the liquid low boiling point component as reflux for the fractionating zone.

15. Method of separating gaseous mixture in a low temperature operation which comprises: separating the gaseous mixture to a first fractionating zone to provide a first portion of a low boiling point component of the gaseous mixture and a first high boiling point fraction, separating the first high boiling point fraction in a second fractionating zone to provide a second portion of said low boiling point component and a second high boiling point fraction, separating the second high boiling point fraction in a third fractionating zone to provide low boiling point component and high boiling point component of gaseous mixture, liquefying the first portion and the second portion of the low boiling point component to provide liquid low boiling point component, and utilizing at least a portion of the liquid low boiling point component as reflux for the third fractionating zone.

References Cited in the file of this patent

UNITED STATES PATENTS

| | | |
|---|---|---|
| 2,280,383 | De Baufre | Apr. 21, 1942 |
| 2,424,201 | Van Nuys | July 15, 1947 |
| 2,433,508 | Dennis | Dec. 30, 1947 |
| 2,545,462 | Haynes | Mar. 20, 1951 |
| 2,779,174 | Vesque | Jan. 29, 1957 |
| 2,909,410 | Fedorko | Oct. 20, 1959 |

FOREIGN PATENTS

| | | |
|---|---|---|
| 1,048,937 | Germany | Jan. 22, 1959 |